(No Model.)

R. B. HOLT.
CIRCULAR SAW MILL.

No. 332,714.   Patented Dec. 22, 1885.

WITNESSES:
Alex McClelland
J. Frank White

INVENTOR
Robert B. Holt
Keyser Reynolds & Ellis
his ATTORNEYS

N. PETERS, Photo-Lithographer, Washington, D. C.

UNITED STATES PATENT OFFICE.

ROBERT B. HOLT, OF GUTHRIE, KENTUCKY, ASSIGNOR OF ONE-HALF TO ISAAC N. WALTON, OF SAME PLACE.

CIRCULAR-SAW MILL.

SPECIFICATION forming part of Letters Patent No. 332,714, dated December 22, 1885.

Application filed June 17, 1885. Serial No. 168,978. (No model.)

*To all whom it may concern:*

Be it known that I, ROBERT B. HOLT, a citizen of the United States, residing at Guthrie, in the county of Todd and State of Kentucky, have invented certain new and useful Improvements in Circular-Saw Mills; and I do hereby declare the following to be a full, clear, and exact description of the invention, such as will enable others skilled in the art to which it appertains to make and use the same.

This invention relates to certain improvements in circular-saw mills; and it consists, substantially, in the parts, as constructed, and in the particular combinations thereof, to be hereinafter distinctly described, and pointed out in the claim.

In carrying my invention into effect I arrange the saw in a vertical plane in bearings that are adjustable vertically, by which the saw is moved to be accommodated to logs of varying sizes, and by which, also, all available cutting edges or teeth are caused to operate at one time against the log or timber in the cutting operation, thus obviating the necessity of a resawing or change of saws, frequently necessary with many saw-mills at present in use, and in many instances dispensing with one of the saws in those mills wherein an upper and lower saw are employed, and which are familiarly termed "double saw-mills."

It is the design of the invention that the log shall be moved up to the saw at such an elevation or position as that the axis of the saw will be in a plane substantially above the log, whereby no weight of the latter will be imposed upon the former, thus lessening the liability of the saw becoming "sprung" from heat due to friction, further objects being to obtain a free motion of the saw and the least possible expenditure of power in driving the same.

Figure 1:
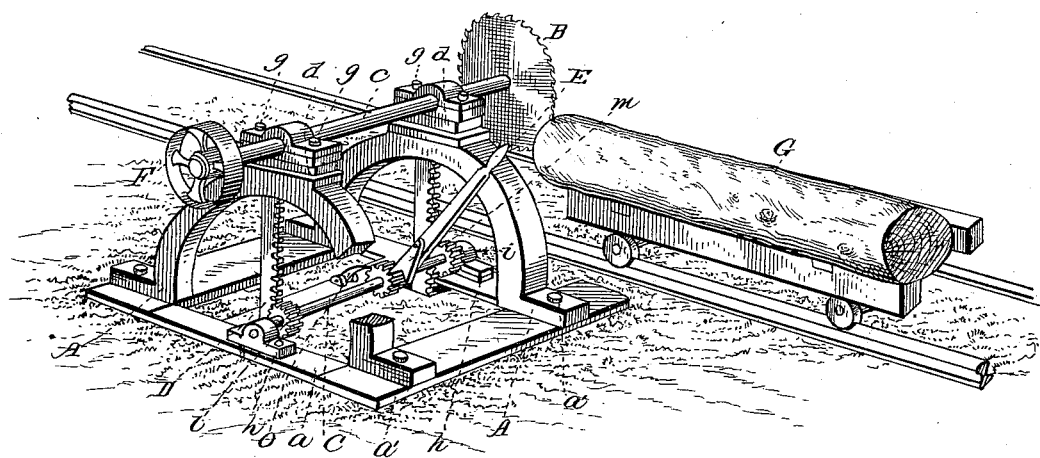
Figure 2:
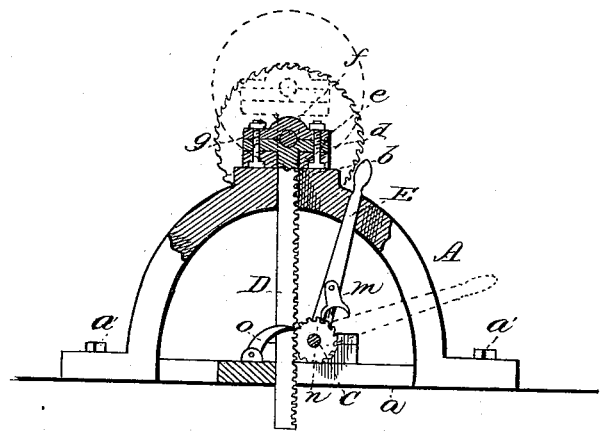

Referring to the annexed sheet of drawings, Figure 1 is a view in perspective of as much of a circular-saw mill as is necessary to illustrate my invention; and Fig. 2 is an end elevation thereof, partly in section.

Reference being had to the several parts by the letters marked thereon, A A represent two curved or arched supports arranged a suitable distance apart, and bolted or otherwise secured to their base a, as represented by the letters a' a'. These arches are each provided centrally with vertical openings b, and they serve between them to support the mandrel or shaft c, to one end of which is affixed the saw B. Moving vertically in each opening b is a toothed rack, D, which is formed at the top with a cross-piece, d, the said cross-pieces being clamped or held between a plate, e, having an opening through which the rack passes, as shown, and an upper curved plate, f, the plates e and f being united or held firmly together by bolts g, and the cross-pieces of the racks and the upper plates, f, constituting bearings for the saw shaft or arbor. Journaled between the two sides of the base a, in bearings h h, is a shaft, C, bearing thereon pinions i i, which correspond to and mesh with the racks, as shown; also, borne by the said shaft, is a lever, E, carrying a pivoted dog, m, which operates the shaft through a pinion, n, rigid thereon, a pivoted detent, o, being located opposite to said pinion and engaging therewith, to prevent back movement when the racks have been operated to elevate the saw to the position represented by dotted lines in Fig. 2.

F represents a belt-pulley, by which a proper connection is made with any suitable source of power for driving the saw, and G designates the log-bearing truck, which moves on a track properly arranged with respect to the saw.

In operation, the log is placed lengthwise upon the truck and the latter moved up until the log is brought into contact with the saw. The log is turned over or shifted at each successive cutting until divided in the manner desired. When the log cannot conveniently be accommodated to the saw, the latter is adjusted in the manner shown and described, until brought to such a position that all available teeth of the saw will act upon the log to cut the same; also, with logs varying in size is this adjustment made.

What I claim is—

In a circular-saw mill, the combination, with the arched supports having openings therein, of a saw-carrying shaft extending across the same in movable bearings, toothed racks moving vertically in the openings of said supports, upon which the bearings rest, a lower shaft bearing pinions which engage the racks for adjusting the same, the operating-lever and its pivoted dog, the actuating-pinion, and the detent by which it is engaged, all substantially as shown, and for the purpose described.

In testimony whereof I affix my signature in presence of two witnesses.

ROBERT B. HOLT.

Witnesses:
E. EVERETT ELLIS,
EARL A. KEYSER.